(12) United States Patent
Glover et al.

(10) Patent No.: US 7,333,994 B2
(45) Date of Patent: Feb. 19, 2008

(54) SYSTEM AND METHOD FOR DATABASE HAVING RELATIONAL NODE STRUCTURE

(75) Inventors: Andrew Glover, Sammamish, WA (US); Samuel Clement, Kirkland, WA (US); Michael Dabrowski, Bolingbrook, IL (US)

(73) Assignee: Microsoft Corporation, Redmond, WA (US)

( * ) Notice: Subject to any disclaimer, the term of this patent is extended or adjusted under 35 U.S.C. 154(b) by 472 days.

(21) Appl. No.: 10/738,252

(22) Filed: Dec. 18, 2003

(65) Prior Publication Data

US 2005/0138003 A1 Jun. 23, 2005

(51) Int. Cl.
*G06F 7/00* (2006.01)
*G06F 17/00* (2006.01)

(52) U.S. Cl. .................. 707/100; 707/101; 707/102
(58) Field of Classification Search .............. 707/1–10, 707/100–104.1, 200–205
See application file for complete search history.

(56) References Cited

U.S. PATENT DOCUMENTS

| | | | | |
|---|---|---|---|---|
| 6,985,902 | B2* | 1/2006 | Wise et al. ................ | 707/10 |
| 2003/0105745 | A1* | 6/2003 | Davidson et al. ............. | 707/3 |
| 2003/0154189 | A1* | 8/2003 | Egilsson et al. .............. | 707/1 |
| 2004/0024790 | A1* | 2/2004 | Everett ...................... | 707/200 |
| 2004/0153463 | A1* | 8/2004 | Sasai et al. ................. | 707/100 |
| 2006/0156253 | A1* | 7/2006 | Schreiber et al. ........... | 715/835 |
| 2006/0167946 | A1* | 7/2006 | Hellman et al. ......... | 707/104.1 |
| 2006/0173873 | A1* | 8/2006 | Prompt et al. ............. | 707/100 |

* cited by examiner

*Primary Examiner*—Hosain Alam
*Assistant Examiner*—Navneet K Ahluwalia
(74) *Attorney, Agent, or Firm*—Shook, Hardy & Bacon L.L.P.

(57) ABSTRACT

A system and related techniques and data structures present a Web based or other client application or service with a relational node structure to access, store and manipulate XML-based or XML-compliant data. Unlike unmodified XML information for instance stored in document object model (DOM) format, the inventive platform may load a relational node structure encapsulating XML-compliant information in an organized structure having pointers to next peer, parent, child and other links to related or unrelated information. Searching, querying and other operations may therefore be made more efficient since an entire tree structure need not be exhaustively traversed to locate desired data, but instead sorted via those relational linkages. Client applications such as Web browsing, email, contacts managers, calendars and others may therefore operate on XML or XML-compliant data without the loading or performance disadvantages which conventional XML platforms may incur. The data populating the relational node structure may be obtained from XML or structured sources, and for instance be loaded from storage in response to a query generated via the query engine.

20 Claims, 6 Drawing Sheets

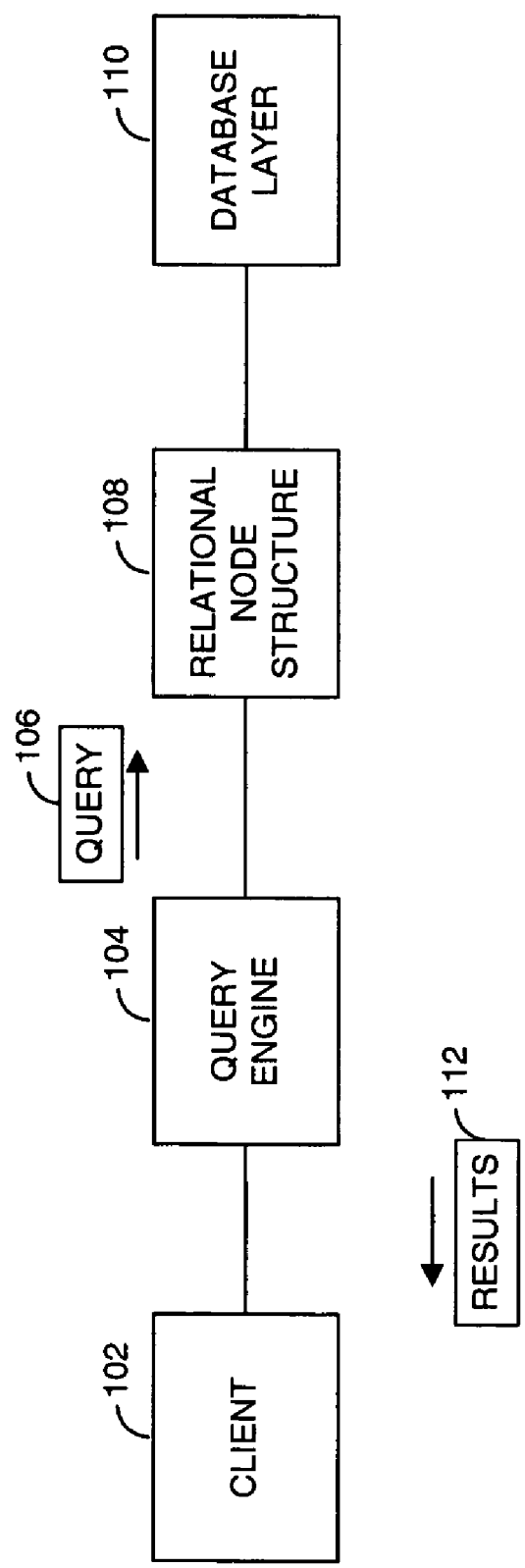

```xml
<addressbook>
<contact addr-id=1>
  <name>
    <first>Joe</first>
    <last>Microsoft</last>
  </name>
  <address>
    <street>One Microsoft Way</street>
    <city>Redmond</city>
    <state>Washington</state>
    <state-abbr>WA</state-abbr>
  </address>
</contact>
<contact addr-id=2>
  <name>
    <first>George</first>
    <last>User</last>
  </name>
  <address>
    <street>12 Crash Avenue</street>
    <city>Los Angeles</city>
    <state>California</state>
    <state-abbr>CA</state-abbr>
  </address>
</contact>
<group addr-id=3>
  <name>My Friends</name>
  <addresses>joe@microsoft.com; homer@simpsons.com</addresses>
</group>
</addressbook>
```

FIG. 2

```
<addressbook>
    <contact                    <- PARENT         - POINTER TO PARENT.
        addr-id=1>              <- ELEMENT
        <name>...</name>        <- ATTRIBUTE
    </contact>                  <- CHILD          0 - TO - MANY
    <contact addr-id=2/>        <- LIKE PEER      (SAME TYPE, DIFFERENT NAMES)
    <group addr-id=3/>          <- PEER           0-TO-MANY SAME PARENT, BUT NOT SAME TYPE.
</addressbook>
```

FIG. 3

```
typedef struct __xnodevalue
{
    DBLENGTH    ValueLength;
    DBSTATUS    ValueStatus;
    WCHAR       Value[1];

} XNODEVALUE, *LPXNODEVALUE;

typedef struct __xnode
{
    xnode*         Parent;
    xnode*         NextLikePeer;
    xnode*         LeftPeer;
    xnode*         RightPeer;
    xnode*         Children;

NAMEID         Nid;
    int            NumChildren;
    VALUEID        Vid;
    LPXNODEVALUE   Value;
} XNODE, *LPXNODE;
```

FIG. 5

SYSTEM AND METHOD FOR DATABASE HAVING RELATIONAL NODE STRUCTURE

CROSS-REFERENCE TO RELATED APPLICATION

Not applicable.

STATEMENT REGARDING FEDERALLY SPONSORED RESEARCH OR DEVELOPMENT

Not applicable.

FIELD OF THE INVENTION

The invention relates to the field of computing, and more particularly to an advanced database platform and related techniques and data structures in which individual nodes encode XML-compatible data including pointers which associate the nodes with nearest neighbors and other relational information, permitting efficient searching and retrieval.

BACKGROUND OF THE INVENTION

Extensible markup language (XML) and related database and query technology has gained increasing popularity as a Web-enabled platform, supporting commercial network services and solutions for a variety of applications. XML has advantages including an inherently hierarchical structure which lend themselves for example to data encapsulation via the document object model (DOM) and other formats or protocols. However, an XML representation of objects such as data stores, Web pages or others may still involve disadvantages of certain types, particularly with regard to loading or execution times for certain applications. This may be in part because searching or querying XML data often requires the traversing of hierarchical structures to descend to nodes or levels of interest, and then retrieve desired data points. In other implementations, data may be stored in a structured format (such as standard query language, SQL) but queried by way of an XML query engine to interface to XML applications. A certain amount of translation time in that case is required to mediate between the two formats.

In applications such as Web browsing or other services, for example retrieving email stores, the user may therefore perceive the time to traverse an XML data store, or to retrieve structured data via an XML translator, as a noticeable lag. Other problems and disadvantages in XML query technology exist.

SUMMARY OF THE INVENTION

The invention overcoming these and other problems in the art relates in one regard to a system and method for a database having a relational node structure, in which an XML-based or XML-compatible representation may be efficiently encoded with relational attributes, such that nodes in the resulting data structure contain pointers to parents, children, next like peer and other node relations. In embodiments, the resulting data structure may be loaded into electronic memory to permit fast traversal of the data structure for query and report purposes, for instance directly via an XML query engine. In implementations that XML query engine may be or include XQUERY, XPATH or other front-end interfaces. In embodiments, the relational node structure may interface to an underlying database layer to populate data values in the node network. That underlying database layer may be or include structured (SQL) or other non-XML based resources, since the front-end query engine may interrogate the intermediate in-memory node structure itself. Searching, querying and other operations may therefore be streamlined since an entire tree structure need not be exhaustively traversed to locate desired data points, but instead sorted via those relational linkages, which may extend in at least three dimensions.

BRIEF DESCRIPTION OF THE DRAWINGS

FIG. 1 illustrates a network environment in which a database having a relational node structure may operate, according to an embodiment of the invention.

FIG. 2 illustrates an illustrative XML document, whose contents may be stored according to an embodiment of the invention.

FIG. 3 illustrates an XML node whose structure may be represented in a relational node structure, according to embodiments of the invention.

FIG. 5 illustrates an example schema for a node in a relational node structure, according to an embodiment of the invention.

DETAILED DESCRIPTION OF EMBODIMENTS

Figure 4:
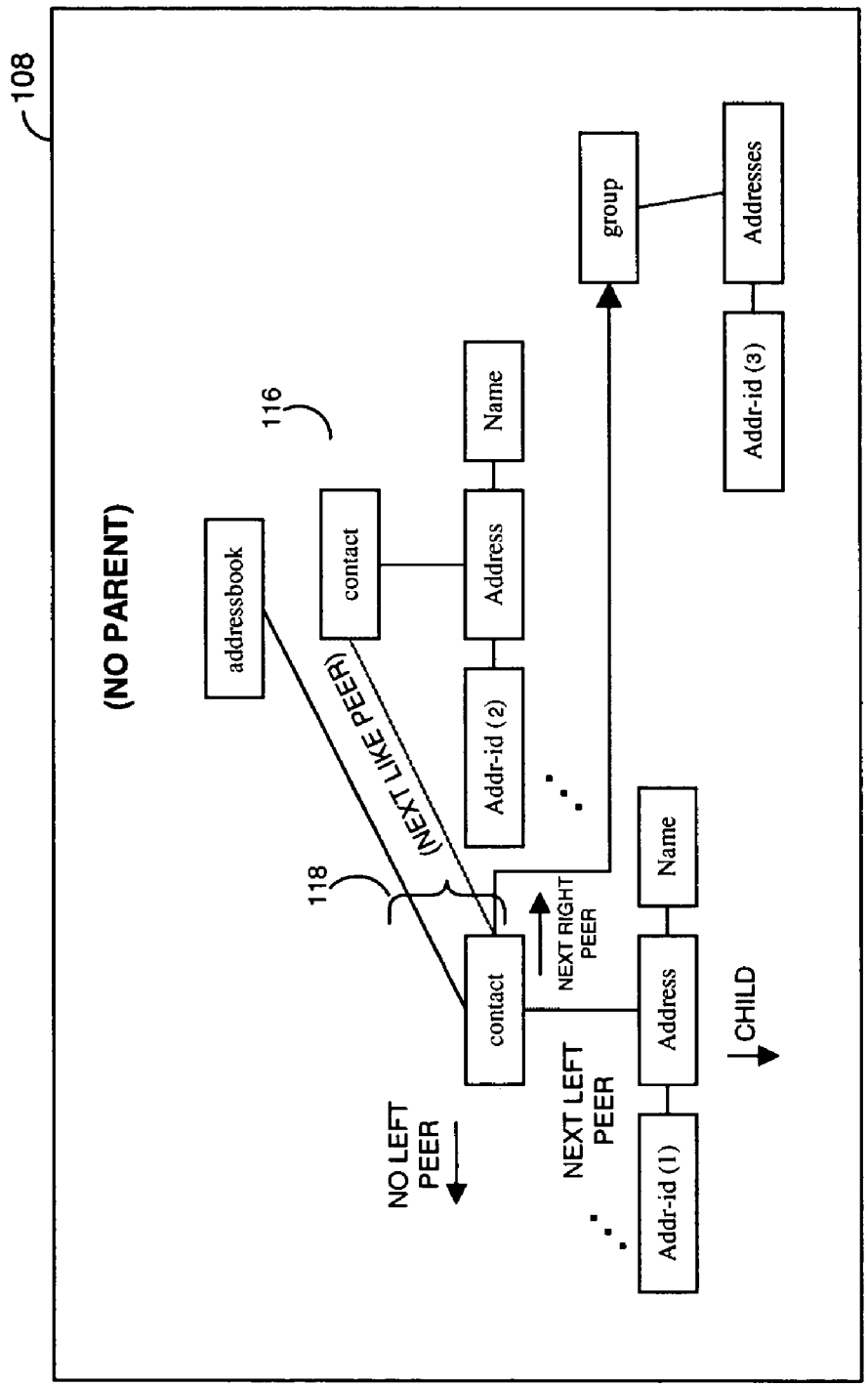
FIG. 4 illustrates a relational node structure, according to embodiments of the invention.

FIG. 1 illustrates an architecture in which a system and method for a database having a relational node structure may operate, according to an embodiment of the invention. As illustrated in that figure, according to the invention a user or users may operate one or more client 102 to access local or remote services, for instance Web browsing, email messaging, contacts or calendar management, or other services or applications. In operation, the user may wish to access services or applications requiring data to be searched or retrieved. For instance the user may wish to retrieve all email messages received last month, or all contact entries for a given company. Those or other necessary requests may be generated via a query engine 104, which in embodiments may be or include an XML query engine, such as an engine configured to perform XPATH or XQUERY operations. Other types of XML or other query engines are possible.

The query engine 104 may communicate a query 106 which attempts to retrieve the desired information to a relational node structure 108. Relational node structure 108 may be or include a logical data schema including a set of nodes configured to store or represent XML-based or XML-compatible information, such as objects generated according to the document object model (DOM) or other formats. In embodiments, the relational node structure 108 may be loaded into electronic memory such as random access memory (RAM) of client 102, such as a personal computer, network-enabled cellular telephone or other client device. The relational node structure 108 may in turn communicate with a database layer 110, which may be or include a local or remote structured database such as a standard query language (SQL) database, an object linking and embedding database (OLEDB) or other structured or non-structured databases or resources. According to the invention in one regard, the relational node structure 108 may populate individual nodes with data retrieved from database layer 110. In embodiments that data may be populated into nodes within the relational node structure 108 in response to processing of query 106, so that data is not searched or transported until necessary, to conserve processing and access times. In general, after query 106 is processed against relational node structure 108, results 112, such as a list of emails, contacts or other data or information may be returned to client 102.

In further detail, the relational node structure 108 may encapsulate or represent information such as an XML document 114, an illustrative example of which is shown in FIG. 2. In general the XML document 114 may contain information encoded in descending levels, each of which may be labeled by attributes and/or populated with data values, such as the address and contact information shown in that figure. Other data is possible.

According to the invention in one regard and as illustrated in FIG. 3, one or more individual node 116 generated or processed according to the invention may contain data values as well as a set of pointers 122 or other relational objects which relate one or more node 116 to other nodes within the relational node structure 108. The set of pointers 122 may be or include pointers or other references which point to, for example, a parent node, a child node, a next left peer node, a next right peer node, a next like peer node or other pointers or identifiers. That is, each node 116 may encode information about surrounding or related nodes within the relational node structure 108. This positional encoding or awareness permits a query 106 for example to be executed with particular efficiency, since a query may seek all email messages from last month, and a node 116 satisfying that data criteria may point to a next like peer representing another message from that same month. The next email message or other desired search object may therefore be directly retrieved, without further parsing of the relational node structure 108 or the individual data contents of that structure, since in some general sense nodes containing related data have been grouped or pre-related in a logical schema. One or more relational node structure 108 may be combined or recombined into another or extended relational node structure 108, or such structures may be grouped into further aggregate structures, in embodiments of the invention.

Therefore as illustrated in FIG. 4, a logical arrangement of relational node structure 108, for example as stored in electronic memory, may extend in three or more dimensions since each individual node 116 may contain a set of pointers 118 pointing to other nodes in an up/down (parent, child or other), side to side (next left peer, next left peer or other), front to back (next like peer or other) or other directional or logical linkage. For example a node 116 may contain data or objects pointing to data, such as NameID, ValueID or other field or identifier, which permit the nodes in relational node structure 108 to be ordered in alphabetical, date, numeric or other order and that configuration to be stored to relational node structure 108. It may be noted that each node 116 which shares a common parent with another node 116 may be directly accessed by that node having that given parent.

Due to that relational nature, for example a query 106 for all email addresses beginning with the letter "M", or contacts having a telephone area code beginning with "206", may in embodiments be carried out in logarithmic time (big O notation), since the search logic may eliminate branches of relational node structure 108 which are not related to the desired attribute or data reflected in query 106. Efficiency and both breadth and depth of search power are enhanced, since the portion of the relational node structure 108 which must be traversed is reduced, compared to typical XML or other data stores. It may again be noted that relational node structure 108 may lay out a schema using the set of pointers 118 which associates related pieces of data, but in embodiments the actual data values may be reserved in database layer 110 or other storage until retrieval is desired, for instance via a lookup table, NameID or other references.

FIG. 5 illustrates a node schema 120 in which a representation of XML data may be stored, for example in memory. As shown the data structure may be defined to encapsulate data type, size, NameID and ValueID (for lookups), parent, child, next like peer, left peer, right peer and other information. XML data loaded into that type of structure may be populated as a node 116 in the relational node structure 108 to query via query engine 104. Other types or configurations of node schema 120 are possible.

Figure 6:
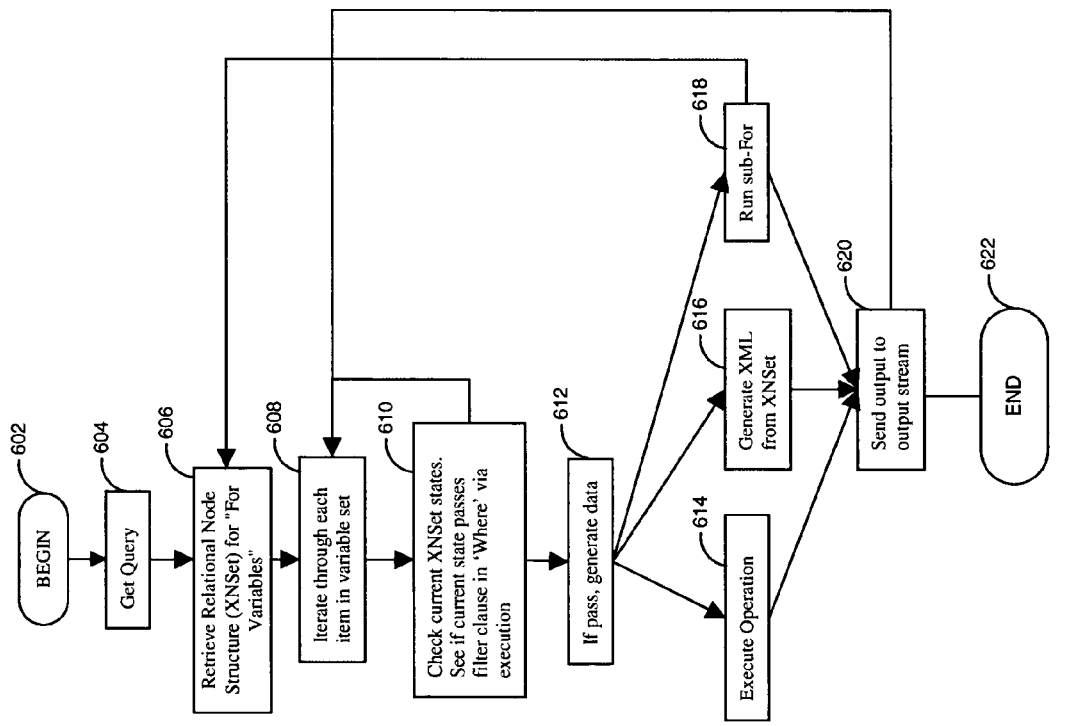
FIG. 6 illustrates a flowchart of XML query processing against a relational node structure, according to embodiments of the invention.

Overall node data processing according to an embodiment of the invention is illustrated in FIG. 6. In step 602, processing may begin. In step 604, the query 106 may be received. In step 606, the relational node structure 108 (XML node set, XNSet) may be retrieved for variables reflected in query 106. In step 608, each item in the variable set reflected in query 106 may be parsed or iterated. In step 610, the state of relational node structure 108 may be checked to determine whether variables reflected in query 106 match a query 106 (via "where" filter or otherwise). In step 612, if a match is made between relational node structure 108 and the variables identified in query 106, the data in one or more matching node 116 may be populated or generated, for instance via lookup against NameID, ValueID or other references. If in step 610, if a match is not made processing may return to step 608 to iterate through a next variable in query 106.

After data generation in step 612, alternate processing branches may be executed. According to one processing branch, in step 614 an operation may be executed on the generated data, for example to add, sort or otherwise process matching results. According to an alternate processing branch, in step 616 an XML document or other XML data may be generated from relational node structure 108. According to another alternate processing branch, in step 618 a subroutine or other further processing on query 106 may be executed. Processing may in embodiments then return to step 606 to retrieve relational node structure 108 related to query variables.

After any of those alternate processing branches, processing may then proceed to step 620, in which the resulting XML document or other data may be sent to an output stream, for example communicated to client 102 as results 112. In step 622, processing may repeat, return to a prior processing point or terminate.

The foregoing description of the invention is illustrative, and modifications in configuration and implementation will occur to persons skilled in the art. For instance, while the invention has generally been described in terms of a relational node structure whose nodes may be populated by data from a single database layer 110, in embodiments multiple database layers or other data stores or sources may be accessed or used to supply data. Likewise, while the invention has been generally described in terms of a single query engine 104 mediating query requests against the relational node structure 108, in embodiments multiple or distributed query engines may be employed.

Similarly, while the invention has in embodiments been described as accessing data from database layer 110 which is locally stored in SQL format, in embodiments databases stored in other structured, XML-based or XML-compatible or other formats may be used. Other hardware, software or other resources described as singular may in embodiments be distributed, and similarly in embodiments resources described as distributed may be combined. Further, while the invention has generally been described in terms of Web-based services or clients accessing the relational node structure 108, in embodiments other services or resources may be encapsulated in relational node structure and related resources of the invention. The scope of the invention is accordingly intended to be limited only by the following claims.

We claim:

1. A database system, comprising:
   an interface to a query engine;
   a database layer; and
   a relational node structure, communicating with the interface to the query engine and the database layer, the relational node structure comprising a set of nodes configured to store data from the database layer and encoding a set of pointers that provide direct relational linkages between child nodes in the set of nodes,
   wherein the set of pointers provides a map of an interrelational structure of the child nodes thereby enabling search logic to bypass branches of the relational node structure when searching therein,
   wherein the set of pointers encoded in the set of nodes extends at least in three dimensions including a child-to-parent node dimension, a next like peer node dimension, and a left-to-right peer node dimension, and data from the database layer is populated into at least one node within the set of nodes in response to processing a query from the query engine,
   wherein the next like peer node dimension is a type of pointer of the set of pointers that provides a direct relational linkage between the child nodes residing at a similar level of the relational node structure having similar attributes therein, wherein the left-to-right peer node dimension is a type of pointer of the set of pointers that provides a direct relational linkage between the child nodes organized in an adjacent lateral structure,
   wherein the next like peer node dimension and the left-to-right peer node dimension facilitate laterally searching across child nodes and directly retrieving data therefrom without further parsing the relational node structure, and
   wherein the set of nodes within the relational node structure is configured to store extensible markup language (XML)-based information such that the query engine generates XML data therefrom.

2. A system according to claim 1, wherein the database layer comprises a structured database.

3. A system according to claim 1, wherein the relational node structure is stored in memory.

4. A system according to claim 1, wherein the query engine transmits a query to run against the relational node structure.

5. A system according to claim 1, wherein the query run against the relational node structure is executed via a binary search.

6. A method of processing data in a database system, comprising:
   receiving a query generated via a query engine;
   communicating the query to a relational node structure comprising a set of nodes configured to store data from a database layer and encoding a set of pointers that provide direct relational linkages between child nodes in the set of nodes,
   wherein the set of pointers provides a map of an interrelational structure of the child nodes thereby enabling search logic to bypass branches of the relational node structure when searching therein,
   wherein the set of pointers in encoded in the set of nodes extends at least in three dimensions including a child-to-parent node dimension, a next like peer node dimension, and a left-to-right peer node dimension,
   wherein the next like peer node dimension and the left-to-right peer node dimension facilitate laterally searching across child nodes and directly retrieving data therefrom without further parsing the relational node structure,
   wherein the next like peer node dimension is a type of pointer of the set of pointers that provides a direct relational linkage between the child nodes residing at a similar level of the relational node structure having similar attributes therein, wherein the left-to-right peer node dimension is a type of pointer of the set of pointers that provides a direct relational linkage between the child nodes organized in an adjacent lateral structure,
   wherein the set of nodes within the relational node structure is configured to store extensible markup language (XML)-based information such that the query engine generates XML data therefrom; and
   populating data from the database layer into at least one node within the set of nodes in response to processing the query generated via the query engine.

7. A method according to claim 6, wherein the query engine comprises an extensible markup language query engine.

8. A method according to claim 6, wherein the database layer comprises a structured database.

9. A method according to claim 6, wherein the relational node structure is stored in memory.

10. A method according to claim 6, further comprising running the query against the relational node structure.

11. A method according to claim 10, wherein the running of the query run against the relational node structure comprises executing a binary search.

12. A data structure storable in computer memory, comprising:
    a relational node structure, the relational node structure comprising—
    a set of nodes configured to store data from a database layer, and
    a set of pointers that provide direct relational linkages between child nodes in the set of nodes,
    wherein the set of pointers provides a map of an interrelational structure of the child nodes thereby enabling search logic to bypass branches of the relational node structure when searching therein,
    wherein the set of pointers extends at least in three dimensions including a child-to-parent node dimension, a next like peer node dimension, and a left-to-right peer node dimension, and data from the, database layer is populated into at least one node within the set of nodes in response to processing a query from a query engine,
    wherein the next like peer node dimension and the left-to-right peer node dimension facilitate laterally searching across child nodes and directly retrieving data therefrom without further parsing the relational node structure, wherein the next like peer node dimension is a type of pointer of the set of pointers that provides a direct relational linkage between the child nodes residing at a similar level of the relational node structure having similar attributes therein, wherein the left-to-right peer node dimension is a type of pointer of the set of pointers that provides a direct relational linkage between the child nodes organized in an adjacent lateral structure, and wherein the set of nodes within the relational node structure is configured to store extensible markup language (XML)-based information such that the query engine generates XML data therefrom.

13. A data structure according to claim 12, wherein the relational node structure is operable to be interrogated via the query engine.

14. A data structure according to claim 13, wherein the query engine comprises an extensible markup language query engine.

15. A data structure according to claim 12, wherein the database layer comprises a structured database.

16. A database system, comprising:
interface means to a query engine means;
database means; and
relational node means, communicating with the interface means and the database means, the relational node means comprising a set of nodes configured to store data from the database means and encoding a set of pointers that provide direct relational linkages between child nodes in the set of nodes, wherein the set of pointers provides a map of an interrelational structure of the child nodes thereby enabling search logic to bypass branches of the relational node structure when searching therein, wherein the set of pointers encoded in the set of nodes extends at least in three dimensions including a child-to-parent node dimension, a next like peer node dimension, and a left-to-right peer node dimension, and data from the database means is populated into at least one node within the set of nodes in response to processing a query from the query engine means, wherein the next like peer node dimension and the left-to-right peer node dimension facilitate laterally searching across child nodes and directly retrieving data therefrom without further parsing the relational node structure, wherein the next like peer node dimension is a type of pointer of the set of pointers that provides a direct relational linkage between the child nodes residing at a similar level of the relational node structure having similar attributes therein, wherein the left-to-right peer node dimension is a type of pointer of the set of pointers that provides a direct relational linkage between the child nodes organized in an adjacent lateral structure, and wherein the set of nodes within the relational node structure is configured to store extensible markup language (XML)-based information such that the query engine generates XML data therefrom.

17. A system according to claim 16, wherein the query engine means comprises an extensible markup language query engine.

18. A transmissible query result, the query result being generated according to a method of:
receiving a query generated via a query engine; and
communicating the query to a relational node structure comprising a set of nodes configured to store data from a database layer and encoding a set of pointers that provide direct relational linkages between child nodes in the set of nodes, wherein the set of pointers provides a map of an interrelational structure of the child nodes thereby enabling search logic to bypass branches of the relational node structure when searching therein, wherein the set of pointers encoded in the set of nodes extends at least in three dimensions including a child-to-parent node dimension, a next like peer node dimension, and a left-to-right peer node dimension, wherein the next like peer node dimension and the left-to-right peer node dimension facilitate laterally searching across child nodes and directly retrieving data therefrom without further parsing the relational node structure, wherein the next like peer node dimension is a type of pointer of the set of pointers that provides a direct relational linkage between the child nodes residing at a similar level of the relational node structure having similar attributes therein, wherein the left-to-right peer node dimension is a type of pointer of the set of pointers that provides a direct relational linkage between the child nodes organized in an adjacent lateral structure, and wherein the set of nodes within the relational node structure is configured to store extensible markup language (XML)-based information such that the query engine generates XML data therefrom;

populating data from the database layer into at least one node within the set of nodes in response to processing the query generated via the query engine; and executing the query against the relational node structure to generate a query result.

19. A query result according to claim 18, wherein the query engine comprises an extensible markup language query engine.

20. A query result method according to claim 18, wherein the relational node structure is stored in memory.

* * * * *